Figure 1:
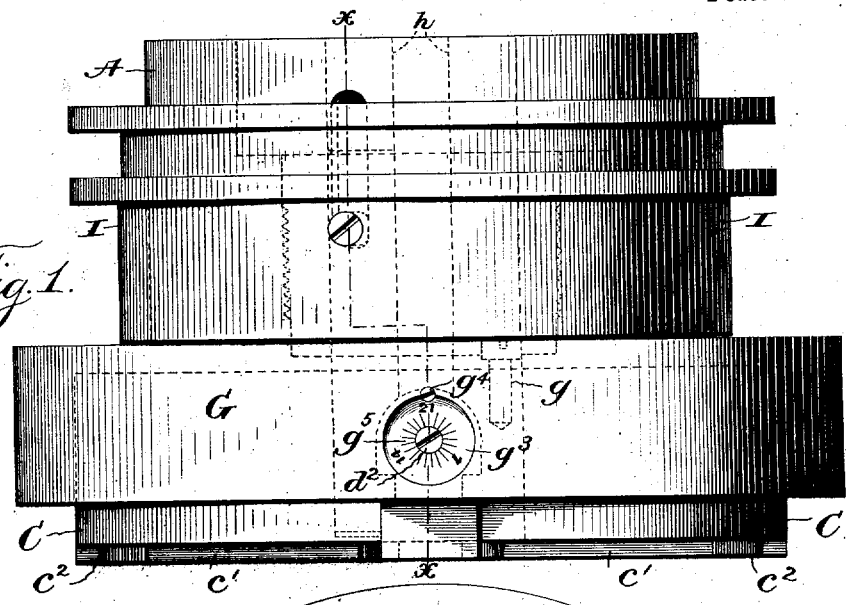

No. 12,068. Reissued Dec. 23, 1902.

J. C. POTTER & J. JOHNSTON.

LATHE CHUCK.

(Application filed July 30, 1901.)

2 Sheets—Sheet 1.

Witnesses:
Jas. E. Hutchinson.
Henry C. Hazard

Inventors.
James C. Potter, and
John Johnston, by
Prindle and Russell, their Attys.

No. 12,068. Reissued Dec. 23, 1902.

J. C. POTTER & J. JOHNSTON.

LATHE CHUCK.

(Application filed July 30, 1901.)

2 Sheets—Sheet 2.

Witnesses:

Jas. E. Hutchinson.

Henry C. Hazard.

Inventors.

James C. Potter and John Johnston, by Prindle and Russell, their Attys.

UNITED STATES PATENT OFFICE.

JAMES CHARLES POTTER AND JOHN JOHNSTON, OF PAWTUCKET, RHODE ISLAND, ASSIGNORS, BY MESNE ASSIGNMENTS, TO THE POTTER AND JOHNSTON MACHINE COMPANY, OF PAWTUCKET, RHODE ISLAND, A CORPORATION OF RHODE ISLAND.

LATHE-CHUCK.

SPECIFICATION forming part of Reissued Letters Patent No. 12,068, dated December 23, 1902.

Original No. 635,976, dated October 31, 1899. Application for reissue filed July 30, 1901. Serial No. 70,308.

*To all whom it may concern:*

Be it known that we, JAMES CHARLES POTTER and JOHN JOHNSTON, of Pawtucket, county of Providence, State of Rhode Island, did invent certain new and useful Improvements in Lathe-Chucks, (for which Letters Patent No. 635,976 were issued upon the 31st day of October, 1899, which Letters Patent have been found to be inoperative and defective and not to cover fully the invention set forth in the specification and shown in the drawings which were filed by us in the Patent Office upon the 17th day of November, 1898, preparatory to the obtaining of said Letters Patent.) Now, therefore, being desirous of reissuing said Letters Patent, we do hereby declare the following to be a full, clear, and exact description of said improvements, reference being had to the accompanying drawings, in which—

Figure 2:
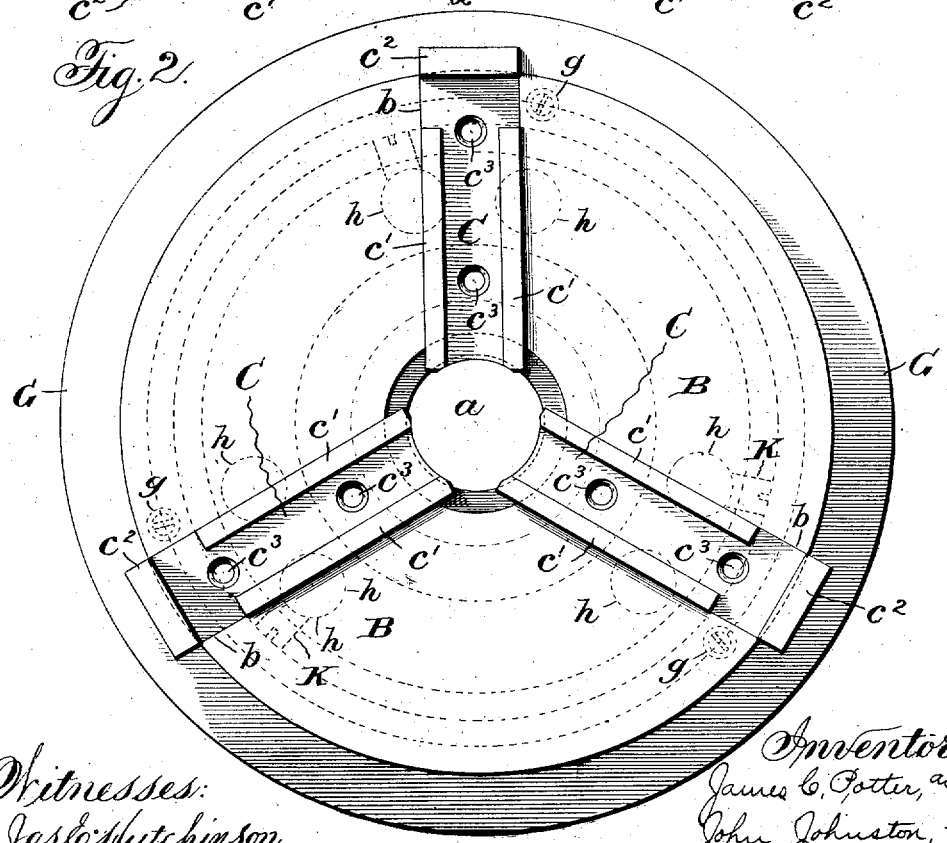
Figure 3:
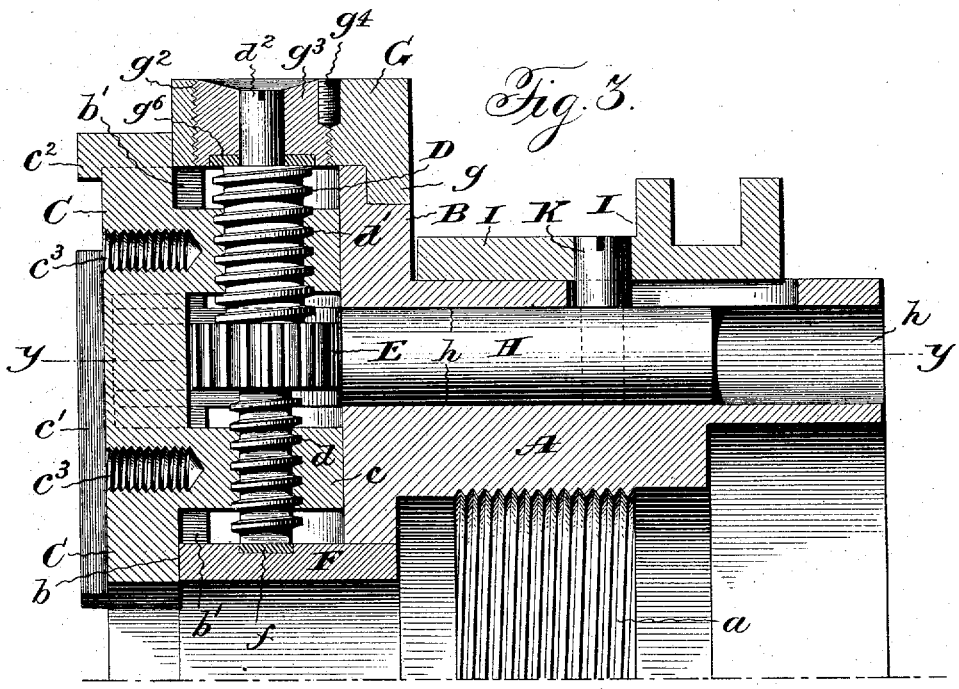
Figure 4:
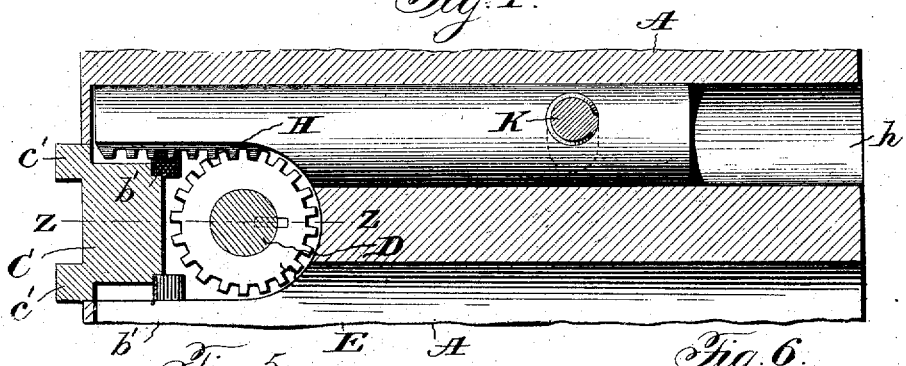
Figure 5:
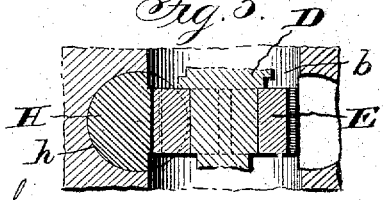
Figure 6:
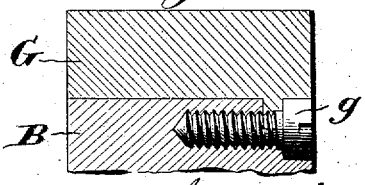

Figure 1 is a plan view of a chuck embodying our invention. Fig. 2 is a front elevation thereof. Fig. 3 is a sectional view of part of the chuck which is the subject of illustration in Figs. 1 and 2, the section being taken on the line *x x* of Fig. 1. Fig. 4 is a partial sectional view taken on the line *y y* of Fig. 3. Fig. 5 is a sectional view taken on the line *z z* of Fig. 4, and Fig. 6 is a fragmental sectional view showing the means for securing the outer ring to the body of the chuck. Figs. 3, 4, 5, and 6 are shown on a larger scale than Figs. 1 and 2.

The object of our invention has been to provide a chuck which shall have, among others, the advantages of being adapted for use in securing the work on the mandrels of lathes, of being capable of opening and closing while the mandrel to which it is secured is in motion, of having means for operating its jaws simultaneously, and also of having provision for the independent adjustment of such jaws, of being simple and strong, and of being quick and powerful in its action, and of being dust-proof; and to such ends our invention consists in the improvements in chucks hereinafter specified.

In carrying our invention into practice we provide a preferably cylindrical chuck-body A, that has an internally-threaded bore *a*, by which it can be screwed upon an externally-threaded end of a lathe-mandrel. A disk-shaped head B is supported by and concentric with the forward end of the body A and is preferably integral therewith. Guideways *b* and *b* are formed in the head and extend radially from the axis of the body and head. Such guideways preferably consist of slots opening through the face of the head, the side walls of the slots being plane surfaces and the rear walls thereof being conveniently made semicylindrical. A rib *b'* is formed on each side wall of each slot. A slide or jaw carrier C is mounted in each guideway, and each of such slides has brackets *c* and *c*, preferably two in number, which project into and preferably fit the portions of the slots to the rear of the ribs. The slides and brackets are grooved to receive the ribs *b'* and *b'*. The faces of the slides are provided with means for holding chuck-jaws. As illustrated, each of the slides has two side ribs *c'* and *c'* and an end rib $c^2$, between which a chuck-jaw can be seated. Threaded holes $c^3$ and $c^3$ are also provided for the engagement of screws for fastening the jaws to the slides. Each slide is reciprocated in its guideway by a screw D. Each screw has two separate threads, preferably of the same pitch, but of different diameters. The smaller thread *d* is preferably on the inner end of the screw and engages a female thread formed in the corresponding bracket *c*. The larger thread *d'* on the outer end of the screw engages a female thread formed in the outer bracket *c*. Between the threads *d* and *d'* a preferably-cylindrical neck is formed on the screw D, on which neck a pinion E is seated, such pinion being fastened on the screw by a key which engages grooves in the screw and in the pinion.

The ends of the screws toward the axis of the chuck are supported by a ring F, which fits in a cylindrical seat in the chuck-head, such ring being situated beneath and closing the guideways. Hardened disks *f* and *f*, preferably formed of steel, are seated in the outer surface of the ring F beneath the screws D and D to form thrust-bearings for the latter. The outer ends of the guideways are closed by a ring G, which fits over the periphery of the head, and such ring has an inwardly-projecting flange $g$, which is received in an annular groove in the head. A series of screws $g'$ and $g'$, which are screwed into the head and which engage the flange $g$, serve to fasten the ring G on the head. In the ring G a hole $g^2$ is formed opposite each guideway $h$, and each of such holes is closed by a plug $g^3$, which is screwed into the hole. Each plug is fastened in the desired adjustment by a screw $g^4$, which is screwed into a hole formed partly in the plug and partly in the ring G. A stem $d^2$ is formed on the outer end of each screw D and has a bearing in a hole formed in the corresponding plug $g^3$. The outer end of each stem has a slot for engagement by a screw-driver or has other means for turning the screw for the purpose of adjustment. A scale $g^5$ is preferably formed on each plug $g^3$, such scale consisting of a series of equidistant lines drawn radially from the screw center, there being one such line for each tooth of the pinion on the screw. A line is drawn on the screw end for use with the scale. The outward end thrust of each screw D is taken by a hardened washer $g^6$, which is seated in a recess in the plug $g^3$ and which is preferably formed of steel.

Racks H and H, each of which is for operating one of the pinions E, are mounted in guideways $h$ and $h$, which extend through the chuck-body and the head, preferably in a direction parallel to the axis of the chuck, there being one of such guideways on each side of each pinion, so that the racks can, by being inserted in the proper guideways, be made to engage either side of the pinions to rotate the latter either to the right or to the left. The racks are formed on bars which are conveniently made cylindrical and which are cut away at their forward ends to enable the teeth to be formed. In order that the pinions may be made of small diameter, the slides are recessed at their sides, so that the racks shall have room for movement.

A shipper-sleeve I is mounted on and reciprocable along the chuck-body, and such sleeve has on it a groove formed by collars on the sleeve, such groove being for engagement with a shipper-lever, or the sleeve can have other means by which it can be reciprocated while it is rotating. A screw K is screwed into each of the rack-bars, and the head of each screw passes through a longitudinal slot in the chuck-body and occupies a hole in the shipper-sleeve.

In assembling the parts of the chuck above illustrated the pinions are placed between the brackets, the splines are seated in the screws D and D, and the smaller ends of the latter are passed through the holes in outer brackets and through the holes in the pinions. The smaller thread on each screw is then engaged with the thread in the corresponding inner bracket, and the larger thread is engaged with the thread in the corresponding outer bracket. The pinions are forced over the corresponding necks and splines, and the turning of the screws is continued until the pinions rest against the lower brackets. The slides, with their screws and pinions, are then passed into the guideways in the head until the stems are within the periphery of the head. The ring G is then slipped over the head from the rear, and the screws which fasten it in place are inserted. The slides, with their screws and pinions, are then moved outwardly in the guideways, the stems passing into the holes in the ring G until the ring F can be passed between the inner ends of the screws, and such ring is then seated, care being taken to bring the hardened disks into line with the screws. The plugs are now screwed home until the desired degree of pressure on the ends of the screws D and D is obtained, and the plugs are then locked by the screws $g^4$ and $g^4$. The rack-bars are inserted from the rear into their guideways. The shipper-sleeve is moved to its extreme rearmost position, and the screws K and K are passed through the holes in the shipper-sleeve and through the slots in the chuck-body and are screwed into the racks. The shipper-sleeve is then moved forward and the racks engage the pinions.

In the operation of the chuck above illustrated, for an inward clamping movement of the jaws the body is screwed upon the mandrel of the lathe and such mandrel is set in motion. The shipper-sleeve is drawn back, and such action, through the screws K and K, causes the rack-bars to be drawn rearward. The pinions are thus rotated, causing the rotation of the screws D and D. The engagement of the threads $d$ and $d'$ with the brackets causes the movement of the slides outward along the guideways. The object to be clamped is now placed between the chuck-jaws, as by being passed through a bore in the mandrel and through the central bore of the chuck-body. The shipper-sleeve is then moved forward, and the racks, pinions, and screws are moved in the directions opposite to their previous movements, causing the chuck-jaws to approach each other and to clamp the work. When it is desired to adjust one of the jaws with reference to the other jaws or to adjust all the jaws for larger or smaller work, the rack-bars are moved to the rear until they are out of engagement with the pinions, the slots in the chuck-body for the screws K and K being made sufficiently long to permit such movement. The screws D and D are then free to be turned independently of each other, and this can be done by a screw-driver placed in engagement with the slots in the ends of the screw-stems. The degree of adjustment can be determined by means of the scales on the plugs $g^3$ and $g^3$. When the jaws have been adjusted, the shipper-sleeve is moved forward to cause the racks again to engage the pinions, and as such engagements occur simultaneously the relative positions of the jaws are not disturbed.

When it is desired to chuck the work by an outward movement of the chuck-jaws, the latter will usually be reversed on the slides. In order that the clamping movement of the shipper-lever may occur in the same direction as when the jaws chuck by an inward movement, the racks are disengaged from the shipper-sleeve and are inserted in the guideways on the opposite sides of the pinions, where they are again secured to the shipper-sleeve. A movement of the racks in a given direction will now revolve the pinions in the reverse direction from that produced by the same movement of the racks in the opposite guideways.

Various changes can be made in the above-illustrated construction that are within the scope of our invention. For instance, the slides and their operating mechanism can be used to operate the jaws of a clutch. It will be observed that the operating mechanism for the chuck-jaws is well protected from dust.

Having thus described our invention, what we claim is—

1. In a chuck, the combination of a jaw, operating means therefor, and a connection between the operating means and the jaw, said connection being reversible and shiftable to either of two positions, whereby a movement of the operating means in a single direction can be made either to open or to close the jaw according as said connection is reversed or not, substantially as and for the purpose described.

2. In a chuck, the combination of jaws, reciprocable means for operating such jaws, and reversible connections between said operating means and said jaws, whereby, by a movement of the operating means in a single direction, the jaws can be made to open or to close, substantially as and for the purpose described.

3. In a chuck, the combination of jaws, a shipper-sleeve, and connections between the jaws and the shipper-sleeve for operating the former from the latter, said connections being reversible, whereby, by a movement of the shipper-sleeve in a single direction, the jaws can be made to open or to close, substantially as and for the purpose described.

4. In a chuck, the combination of jaws, a shipper-sleeve, and connections between the jaws and the shipper-sleeve for operating the former from the latter, said connections comprising racks and pinions, and means whereby said racks can be made to engage either side of said pinions, whereby a given motion of said shipper-sleeve can be made either to open or to close said jaws, substantially as and for the purpose described.

5. In a chuck, the combination of jaws, a shipper-sleeve, and connections between the jaws and the sleeve, for operating the former from the latter, said connections comprising screws which engage the jaws, pinions which turn said screws, and racks which are carried by said sleeve, and means whereby said racks can be made to engage either side of said pinions, substantially as and for the purpose described.

6. In a chuck, the combination of a jaw, a screw extending crosswise of the chuck-axis for moving the jaw, a pinion on the screw, a rack mounted in a guideway in the chuck-body adapted to rotate the pinion, said rack being movable to a position from engagement with the pinion to a position to free it from the latter, whereby the screw may be revolved independently of the rack, a shipper-sleeve, and a connection between said sleeve and said rack, whereby movement of the rack may be effected from the shipper-sleeve.

7. In a chuck, the combination of jaws, a shipper-sleeve, racks and pinions for moving the jaws, said racks being mounted in guideways in the chuck-body, and pins passing through slots in the chuck-body that connect the racks and sleeve, said sleeve being capable of movement to turn the pinions by means of the racks, and of a further movement to disengage the racks from the pinions, substantially as described.

8. In a chuck, the combination of jaws, pinions for operating said jaws, racks for turning said pinions, and means whereby said racks can be made to engage either side of said pinions, substantially as and for the purpose described.

9. In a chuck, the combination of jaws, pinions for operating said jaws, racks for turning said pinions, and guideways for said racks, there being a guideway on each side of each pinion from one to the other of which the rack is shiftable, whereby the rack may be placed in position to engage the pinion on opposite sides, substantially as and for the purpose described.

10. In a chuck, the combination of jaws, radial guideways therefor, screws having threaded engagement with the jaws, pinions, each of which is mounted on one of the screws, racks, each of which engages one of said pinions, means for operating the racks, and graduated indexes, each of which surrounds an end of one of the screws whereby the screws may be turned through a predetermined part of a revolution or revolutions, and the jaws accurately adjusted, substantially as and for purpose described.

11. In a chuck, the combination of a chuck-body, a disk-shaped head provided with guideways, jaws, jaw-carriers mounted in said guideways, each of said carriers having brackets, screws, each of which has threads of different diameters but of the same pitch, and each of which screws has threaded engagement with one of said brackets, pinions, each of which is mounted on one of the screws, racks, a grooved shipper-sleeve, and studs connecting said racks and said sleeve, whereby the jaws can be operated to hold and release the work, substantially as and for the purpose described.

12. In a chuck, the combination of a chuck-body, a disk-shaped head, the head being provided with radial guideways, and the body being provided with guideways which intersect the guideways in the head, jaws, jaw-carriers having brackets which occupy the radial guideways, screws, each of which has threaded engagement with the brackets of one of the carriers, pinions, each of which is mounted on one of the screws, a ring mounted on the periphery of the said head, a ring mounted within a bore in the head, racks for operating said pinions, said racks being mounted in the guideways in the chuck-body, and studs connecting the racks and the shipper-sleeve, substantially as and for the purpose described.

13. In a chuck, the combination of a chuck-body, provided with guideways, a disk-shaped head provided with guideways, an outer ring mounted on the periphery of the head, washers seated in the inner face of such ring, an inner ring mounted within a bore in the head and having disks seated in its outer face, screw-plugs mounted in said outer ring in line with said washers, jaws, jaw-carriers having brackets mounted in said guideways in said head, screws, each of which is in threaded engagement with the brackets on one of said carriers, and whose ends bear on said washers and said disks, pinions, each of which is mounted on one of said screws, racks, a grooved shipper-sleeve, and studs connecting said racks and said shipper-sleeve, substantially as and for the purpose described.

In testimony that we claim the foregoing we have hereunto set our hands this 5th day of July, 1901.

JAMES CHARLES POTTER.
JOHN JOHNSTON

Witnesses:
GEO. I. PARKER,
VERIMON L. MINER.